United States Patent
Beatty et al.

(10) Patent No.: US 8,650,160 B1
(45) Date of Patent: Feb. 11, 2014

(54) SYSTEMS AND METHODS FOR RESTORING MULTI-TIER APPLICATIONS

(75) Inventors: Louis J. Beatty, Ormond Beach, FL (US); Deepak Saraf, Windermere, FL (US)

(73) Assignee: Symantec Corporation, Mountain View, CA (US)

( * ) Notice: Subject to any disclaimer, the term of this patent is extended or adjusted under 35 U.S.C. 154(b) by 57 days.

(21) Appl. No.: 13/341,858

(22) Filed: Dec. 30, 2011

(51) Int. Cl.
G06F 17/30 (2006.01)
G06F 15/16 (2006.01)

(52) U.S. Cl.
USPC ............................. 707/674; 707/675; 707/679

(58) Field of Classification Search
USPC .......................................... 707/674, 675, 679
See application file for complete search history.

(56) References Cited

U.S. PATENT DOCUMENTS

| | | | |
|---|---|---|---|
| 2010/0070476 A1* | 3/2010 | O'Keefe et al. | 707/640 |
| 2010/0274765 A1* | 10/2010 | Murphy et al. | 707/652 |
| 2012/0005165 A1* | 1/2012 | Tsai et al. | 707/652 |
| 2012/0030261 A1* | 2/2012 | Mason et al. | 707/822 |

\* cited by examiner

Primary Examiner — Alex Gofman
(74) Attorney, Agent, or Firm — ALG Intellectual Property, LLC

(57) ABSTRACT

A computer-implemented method for restoring multi-tier applications may include (1) identifying a request to restore a multi-tier application from a backup of the multi-tier application, the multi-tier application including a plurality of individually relocatable components, (2) in response to the request, retrieving a configuration data store from the backup, the configuration data store including a topology of the plurality of individually relocatable components, (3) parsing the configuration data store to extract at least a portion of the topology from the configuration data store, and (4) restoring at least a portion of the multi-tier application based on the portion of the topology. Various other methods, systems, and computer-readable media are also disclosed.

15 Claims, 6 Drawing Sheets

SYSTEMS AND METHODS FOR RESTORING MULTI-TIER APPLICATIONS

BACKGROUND

In the digital age, organizations increasingly rely on digitally-stored data. To protect against data loss, an organization may use a backup system to back up important data.

Due to increasingly complex information technology infrastructures, backup and restoration systems may also take the configuration of applications into account in order to correctly restore the applications. For example, a multi-tier application (e.g., MICROSOFT SHAREPOINT) may include multiple components, and restoring the multi-tier application may require information about the relationships between these components. Accordingly, a traditional backup system may use an application programming interface ("API") of the multi-tier application at the time of backup to access this information and then include the information with the backup.

Unfortunately, the activities of traditional backup systems may sometimes consume computing resources to the point of interfering with the performance of primary applications. Accordingly, communicating with a multi-tier application at the time of backup and thereby potentially increasing the load on a primary server may cause undesired performance degradation of the multi-tier application. Therefore, the instant disclosure identifies and addresses a need for additional and improved systems and methods for restoring multi-tier applications.

SUMMARY

As will be described in greater detail below, the instant disclosure generally relates to systems and methods for restoring multi-tier applications by extracting topological information from configuration data stores of backed up multi-tier applications at restoration time. In one example, a computer-implemented method for restoring multi-tier applications may include (1) identifying a request to restore a multi-tier application from a backup of the multi-tier application, the multi-tier application including a plurality of individually relocatable components, (2) in response to the request, retrieving a configuration data store from the backup, the configuration data store including a topology of the plurality of individually relocatable components, (3) parsing the configuration data store to extract at least a portion of the topology from the configuration data store, and (4) restoring at least a portion of the multi-tier application based on the portion of the topology.

In some examples, a first component of the multi-tier application may have been located on a first server of a server farm at a time of the backup. Likewise, a second component of the multi-tier application may have been located on a second server of the server farm at the time of the backup. In these examples, the portion of the topology may represent the first component on the first server and the second component on the second server. Additionally, in these examples, the server farm may include a plurality of virtual machines. Accordingly, the first server may include a first virtual machine and the second server may include a second virtual machine.

In some embodiments, parsing the configuration data store may include retrieving topological data from the configuration data store and generating a relationship map of the plurality of individually relocatable components based on the topological data. In these embodiments, restoring the portion of the multi-tier application may be based on the relationship map.

In some examples, the topology may be accessible from the configuration data store via an application programming interface of the multi-tier application. In these examples, parsing the configuration data store may entail parsing the configuration data store without using the application programming interface.

In at least one example, parsing the configuration data store may include parsing the configuration data store while the configuration data store is unmounted as a database. Additionally or alternatively, parsing the configuration data store may include parsing the configuration data store after the request. In some embodiments, restoring the portion of the multi-tier application may include restoring a single component from the plurality of individually relocatable components instead of every component from the plurality of individually relocatable components.

In one embodiment, a system for implementing the above-described method may include (1) an identification module programmed to identify a request to restore a multi-tier application from a backup of the multi-tier application, the multi-tier application including a plurality of individually relocatable components, (2) a retrieval module programmed to, in response to the request, retrieve a configuration data store from the backup, the configuration data store including a topology of the plurality of individually relocatable components, (3) a parsing module programmed to parse the configuration data store to extract at least a portion of the topology from the configuration data store, and (4) a restoration module programmed to restore at least a portion of the multi-tier application based on the portion of the topology. The system may also include at least one processor configured to execute the identification module, the retrieval module, the parsing module, and the restoration module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a request to restore a multi-tier application from a backup of the multi-tier application, the multi-tier application including a plurality of individually relocatable components, (2) in response to the request, retrieve a configuration data store from the backup, the configuration data store including a topology of the plurality of individually relocatable components, (3) parse the configuration data store to extract at least a portion of the topology from the configuration data store, and (4) restore at least a portion of the multi-tier application based on the portion of the topology.

As will be explained in greater detail below, by extracting topological information from configuration data stores of backed up multi-tier applications at restoration time, the systems and methods described herein may restore multi-tier applications without burdening and, therefore, potentially impacting the performance of the multi-tier applications at the time of backup. Furthermore, in some examples these systems and methods may facilitate the granular restoration of multi-tier applications.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
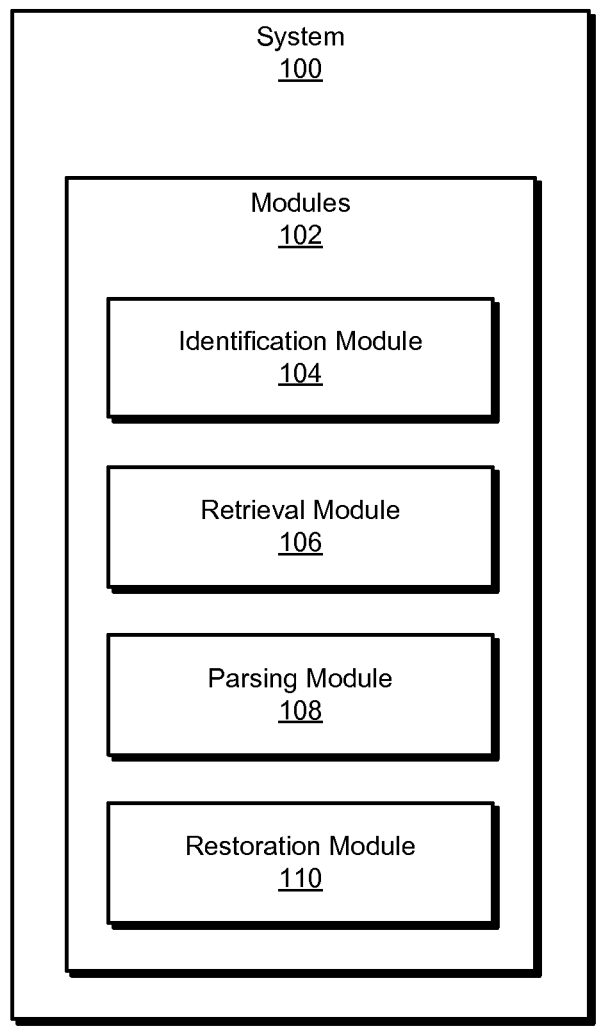
FIG. 1 is a block diagram of an exemplary system for restoring multi-tier applications.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
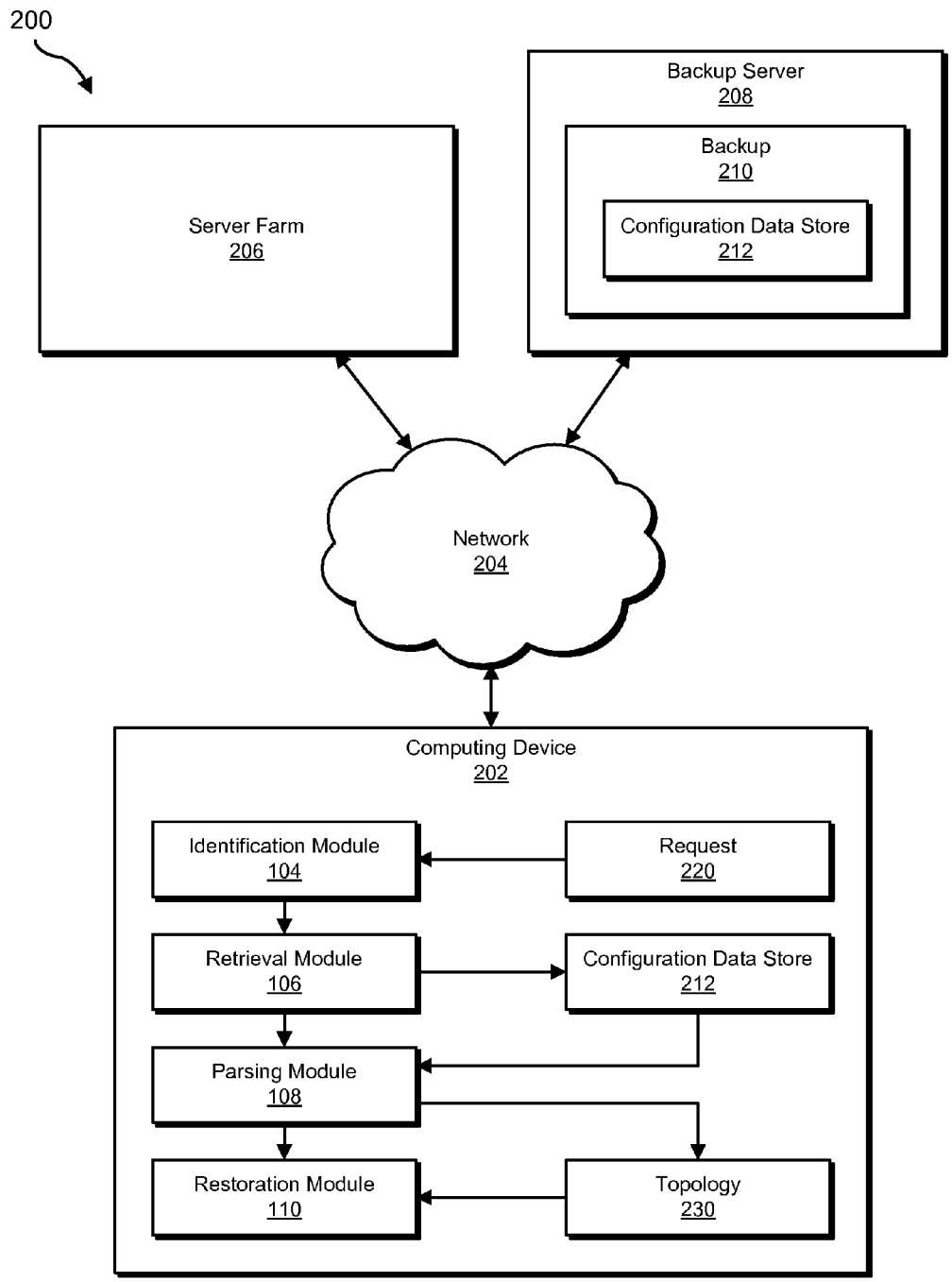
FIG. 2 is a block diagram of an exemplary system for restoring multi-tier applications.
Figure 3:
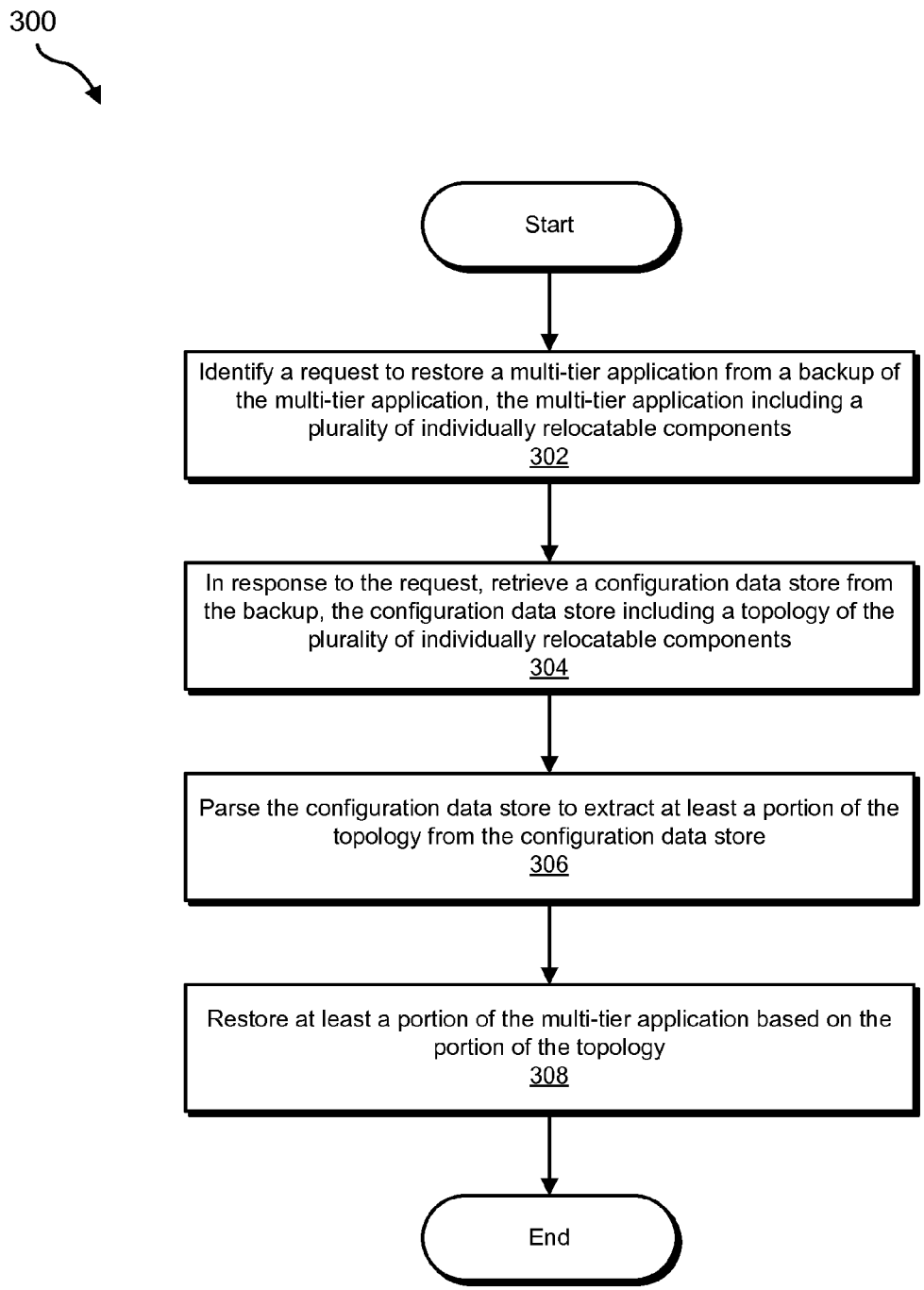
FIG. 3 is a flow diagram of an exemplary method for restoring multi-tier applications.
Figure 4:
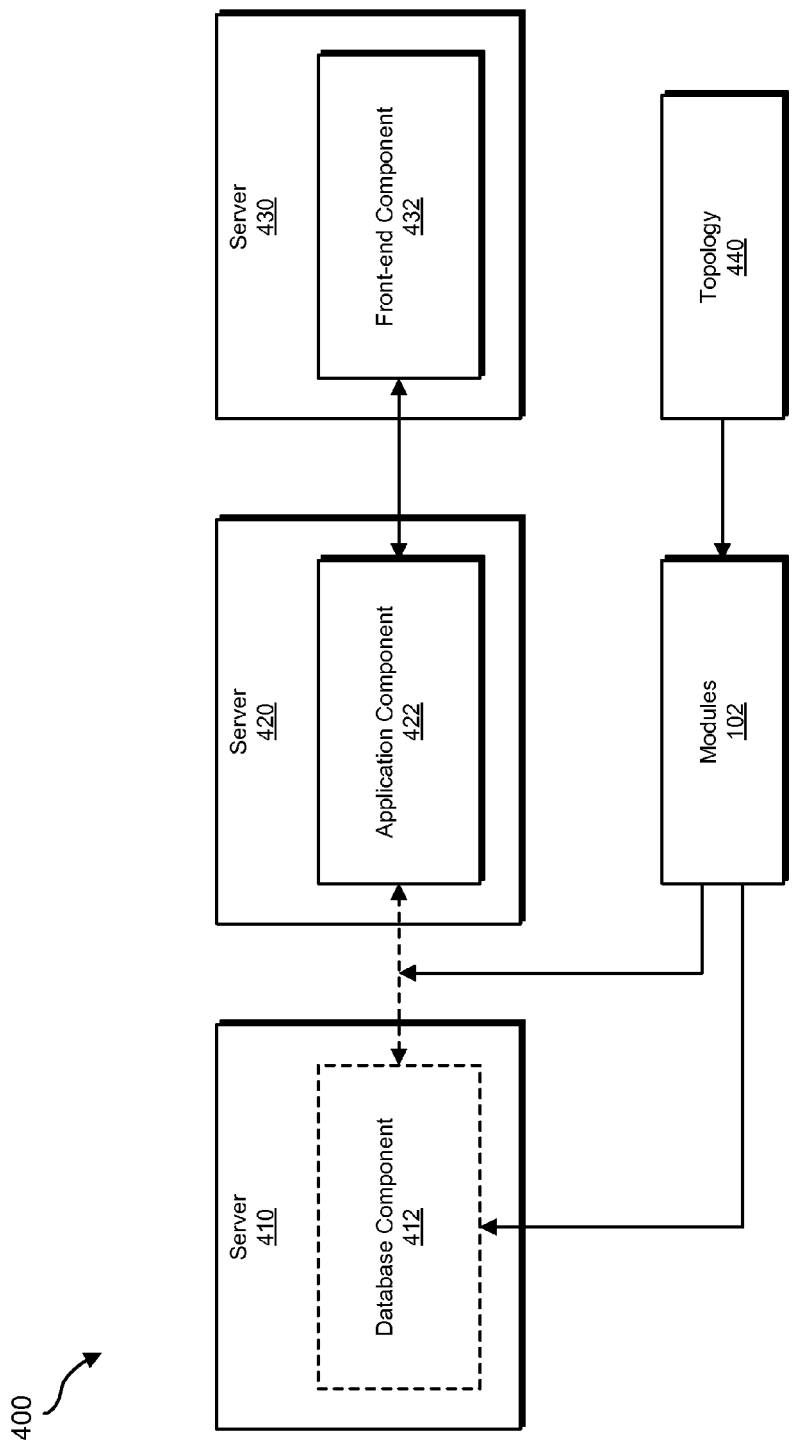
FIG. 4 is a block diagram of an exemplary system for restoring multi-tier applications.

The following will provide, with reference to FIGS. 1, 2, and 4, detailed descriptions of exemplary systems for restoring multi-tier applications. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for restoring multi-tier applications. As illustrated in this figure, exemplary system 100 may include one or more modules 102 for performing one or more tasks. For example, and as will be explained in greater detail below, exemplary system 100 may include an identification module 104 programmed to identify a request to restore a multi-tier application from a backup of the multi-tier application, the multi-tier application including a plurality of individually relocatable components. Exemplary system 100 may also include a retrieval module 106 programmed to, in response to the request, retrieve a configuration data store from the backup, the configuration data store including a topology of the plurality of individually relocatable components.

In addition, and as will be described in greater detail below, exemplary system 100 may include a parsing module 108 programmed to parse the configuration data store to extract at least a portion of the topology from the configuration data store. Exemplary system 100 may also include a restoration module 110 programmed to restore at least a portion of the multi-tier application based on the portion of the topology.

Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202, server farm 206, and/or backup server 208), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server farm 206 and a backup server 208 via a network 204. For example, computing device 202 may be configured restore at least a portion of a multi-tier application from backup server 208 to server farm 206.

In one embodiment, identification module 104, retrieval module 106, parsing module 108, and/or restoration module 110 from FIG. 1 may, when executed by at least one processor of computing device 202, facilitate computing device 202 in restoring multi-tier applications. For example, and as will be described in greater detail below, one or more of modules 102 may cause computing device 202 to (1) identify a request (e.g., a request 220) to restore a multi-tier application from a backup (e.g., a backup 210) of the multi-tier application, the multi-tier application including a plurality of individually relocatable components, (2) in response to the request, retrieve a configuration data store (e.g., a configuration data store 212) from the backup, the configuration data store including a topology of the plurality of individually relocatable components, (3) parse the configuration data store to extract at least a portion of the topology (e.g., a topology 230) from the configuration data store, and (4) restore at least a portion of the multi-tier application based on the portion of the topology (e.g., restore at least a portion of the multi-tier application from backup 210 to server farm 206 based on topology 230).

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Server farm 206 generally represents any type or form of computing devices that are capable of executing one or more components of multi-tier applications. Examples of server farm 206 include, without limitation, application servers and database servers configured to provide various database services and/or run certain software applications.

Backup server 208 generally represents any type or form of computing device that is capable of processing, storing, accessing, and/or retrieving backup data. Examples of backup server 208 include, without limitation, backup application servers and backup database servers.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and server farm 206.

FIG. 3 is a flow diagram of an exemplary computer-implemented method 300 for restoring multi-tier applications. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a request to restore a multi-tier application from a backup of the multi-tier application, the multi-tier application including a plurality of individually relocatable components. For example, at step 302 identification module 104 may, as part of computing device 202 in FIG. 2, identify request 220 to restore a multi-tier application from backup 210.

As used herein, the phrase "multi-tier application" generally refers to any application with independently executable, locatable, and/or configurable components which, in combination, may provide a service. In some examples, each component of the multi-tier application may include a separate application. As used herein, the phrase "individually relocatable component" may refer to any component of a multi-tier application that may be installed, configured, and/or executed separately from other components of the multi-tier application. For example, a multi-tier application may include one or more database components, one or more business logic components, and/or one or more presentation components. In this example, the presentation component may present a user interface for the multi-tier application. The presentation component may communicate with the business logic component to process service requests and the business logic component may communicate with the database component to store and/or retrieve data. As will be described in greater detail below, in some examples, one or more components within the plurality of individually relocatable components may execute on different computing systems.

In at least one example, the multi-tier application may include a content management system. As used herein, the term "content management system" may refer to any system capable of providing one or more views and/or interfaces for a collection of data. For example, a content management system may provide document checkout services, shared contacts, formatted views of information from a database, collaborative editing services, etc. For example, the multi-tier application may include MICROSOFT SHAREPOINT. Accordingly, the multi-tier application may include a variety of components such as a web frontend, a query service, an indexing service, a spreadsheet calculation service, a content database service, etc.

As mentioned earlier, the individually relocatable components of the multi-tier application may be configured to execute on different computing systems (e.g., at the time of backup). For example, a first component of the multi-tier application may have been located on a first server of a server farm at a time of the backup, and a second component of the multi-tier application may have been located on a second server of the server farm at the time of the backup. As used herein, the phrase "server farm" may refer to any collection and/or cluster of computing devices. In some examples, one or more servers within a server farm may communicate with one or more additional servers within the server farm as a part of the multi-tier application. In some examples, the server farm may include a plurality of virtual machines. In this example, the first server may include a first virtual machine and the second server may include a second virtual machine. Accordingly, in some examples the plurality of virtual machines may operate under a single hypervisor to constitute the server farm. As used herein, the phrase "virtual machine" generally refers to a computing system platform that may not have direct correspondence to hardware of an underlying host machine. For example, hardware of a host system may be abstracted to a virtual machine using a hypervisor or other virtualization software. A virtual machine may run a guest operating system and/or various other software applications.

The request to restore the multi-tier application may include any of a variety of requests. In some examples, the request to restore the multi-tier application may include a request to restore a portion (e.g., a component) of the multi-tier application. Additionally or alternatively, the request to restore the multi-tier application may include a request to prepare the multi-tier application for restoration. For example, the request to restore the multi-tier application may include a request to present information in a user interface to facilitate the restoration of at least a portion of the multi-tier application.

Identification module 104 may identify the request in any suitable manner. For example, identification module 104 may receive the request from a user interface. Additionally or alternatively, identification module 104 may receive the request as a message and/or instruction from a restoration system.

FIG. 4 illustrates an exemplary system 400 for restoring multi-tier applications. As shown in FIG. 4, exemplary system 400 may include servers 410, 420, and 430. In this example, the multi-tier application may include a database component 412, an application component 422, and a front-end component 432. In one example, at step 302 identification module 104 may identify a request to restore database component 412 of the multi-tier application.

Returning to FIG. 3, at step 304 one or more of the systems described herein may, in response to the request, retrieve a configuration data store from the backup, the configuration data store including a topology of the plurality of individually relocatable components. For example, at step 304 retrieval module 106 may, as part of computing device 202 in FIG. 2, in response to request 220, retrieve configuration data store 212 from backup 210.

As used herein, the phrase "configuration data store" may refer to any collection of data used by the multi-tier application to store information about the configuration of the multi-tier application. For example, the configuration data store may store information about the topology of the multi-tier application and/or the relationship between one or more of the individually relocatable components of the multi-tier application. In at least one example, the configuration data store may include a database file. In some examples, the configuration data store may include data native to the multi-tier application (e.g., data generated, maintained, and/or accessed by the multi-tier application for the operation and/or configuration of the multi-tier application).

As used herein, the term "topology" as applied to a multi-tier application may refer to any information relating to a location of one or more components of the multi-tier application, an identifier of one or more components of the multi-tier application, a relationship between two or more components of the multi-tier application, and/or a dependency between two or more components of the multi-tier application.

Retrieval module 106 may retrieve the configuration data store from the backup in any suitable manner. For example, retrieval module 106 may identify a database file designated as a configuration database file for the multi-tier application. Retrieval module 106 may then request a copy of the database file from the backup of the multi-tier application.

Returning to FIG. 3, at step 306 one or more of the systems described herein may parse the configuration data store to extract at least a portion of the topology from the configuration data store. For example, at step 306 parsing module 108 may, as part of computing device 202 in FIG. 2, parse configuration data store 212 to extract topology 230 from configuration data store 212. Using FIG. 4 as an example, at step 306 parsing module 108 may extract a topology 440.

The topology may represent any of a variety of configurations of the multi-tier application. For example, as mentioned earlier, in some examples, a first component of the multi-tier application may have been located on a first server of a server farm at a time of the backup, and a second component of the multi-tier application may have been located on a second server of the server farm at the time of the backup. In these examples, the portion of the topology may represent the first component on the first server and the second component on the second server.

In some examples, parsing module 108 may retrieve topological data from the configuration data store and then generate a relationship map of the plurality of relocatable components based on the topological data. For example, the configuration data store may store information sufficient to indicate and/or reconstruct the topology of the multi-tier application. Parsing module 108 may therefore gather the relevant information (e.g., identifiers of components of the multi-tier application, locations of the components, dependencies between the components, etc.) and construct a relationship map based on the relevant information. In some examples, parsing module 108 may generate a relationship map representing only a portion of the topology of the multi-tier application. For example, parsing module 108 may identify, within the request, a portion of the multi-tier application to be restored. Parsing module 108 may then parse the configuration data store only for data relevant to the portion of the multi-tier application to be restored.

Parsing module 108 may parse the configuration data store in any of a variety of ways. In some examples, the topology may be accessible from the configuration data store via an application programming interface of the multi-tier application. Nevertheless, in these examples parsing module 108 may parse the configuration data store without using the application programming interface. For example, parsing module 108 may parse the configuration data store without interaction with the multi-tier application (e.g., either at the time of backup or at the time of restoration). As used herein, the phrase "application programming interface" may refer to any interface whereby an application (e.g., the multi-tier application) communicates with another application. For example, the application programming interface may include a specification and/or interface for a remote procedure call, a query-response based service, or the like.

As mentioned earlier, in some examples the configuration data store may include a database file. In some examples, parsing module 108 may parse the configuration data store while the configuration data store is unmounted as a database. For example, parsing module 108 may directly read from the database file.

Parsing module 108 may parse the configuration data store in any suitable context. For example, parsing module 108 may parse the configuration data store after the request. In this example, after one or more of the systems described herein receives the request to perform a restoration operation for the multi-tier application, parsing module 108 may parse the configuration data store in order to gather information for effectively and efficiently performing the restoration operation.

Returning to FIG. 3, at step 308 one or more of the systems described herein may restore at least a portion of the multi-tier application based on the portion of the topology. For example, at step 308 restoration module 110 may, as part of computing device 202 in FIG. 2, restore at least a portion of the multi-tier application from backup 210 to server farm 206 based on topology 230. Using FIG. 4 as an example, at step 308 restoration module 110 may restore database component 412 to server 410 (e.g., preserving a relationship between database component 412 and application component 422) based on topology 440.

As mentioned earlier, in some examples one or more of the systems described herein may generate a relationship map based on topological data retrieved from the configuration data store. In these examples, restoration module 110 may restore the portion of the multi-tier application based on the relationship map. For example, restoration module 110 may restore the portion of the multi-tier application while preserving the relationship between two or more components of the multi-tier application (e.g., by configuring components of the multi-tier application to correctly reference each other based on the relationship map).

In some examples, restoration module 110 may restore the portion of the multi-tier application by restoring a single component from the plurality of individually relocatable components instead of every component from the plurality of individually relocatable components. For example, by accessing the portion of the topology retrieved from the configuration data store, restoration module 110 may correctly perform a granular restoration of the multi-tier application. In some examples, this may allow restoration module 110 to separately restore components of the multi-tier application as needed. Additionally or alternatively, this may allow restoration module 110 to restore components in modified configurations (e.g., to alternate locations within a server farm).

As explained above, by extracting topological information from configuration data stores of backed up multi-tier applications at restoration time, the systems and methods described herein may restore multi-tier applications without burdening and, therefore, potentially impacting the performance of the multi-tier applications at the time of backup. Furthermore, in some examples these systems and methods may facilitate the granular restoration of multi-tier applications.

Figure 5:
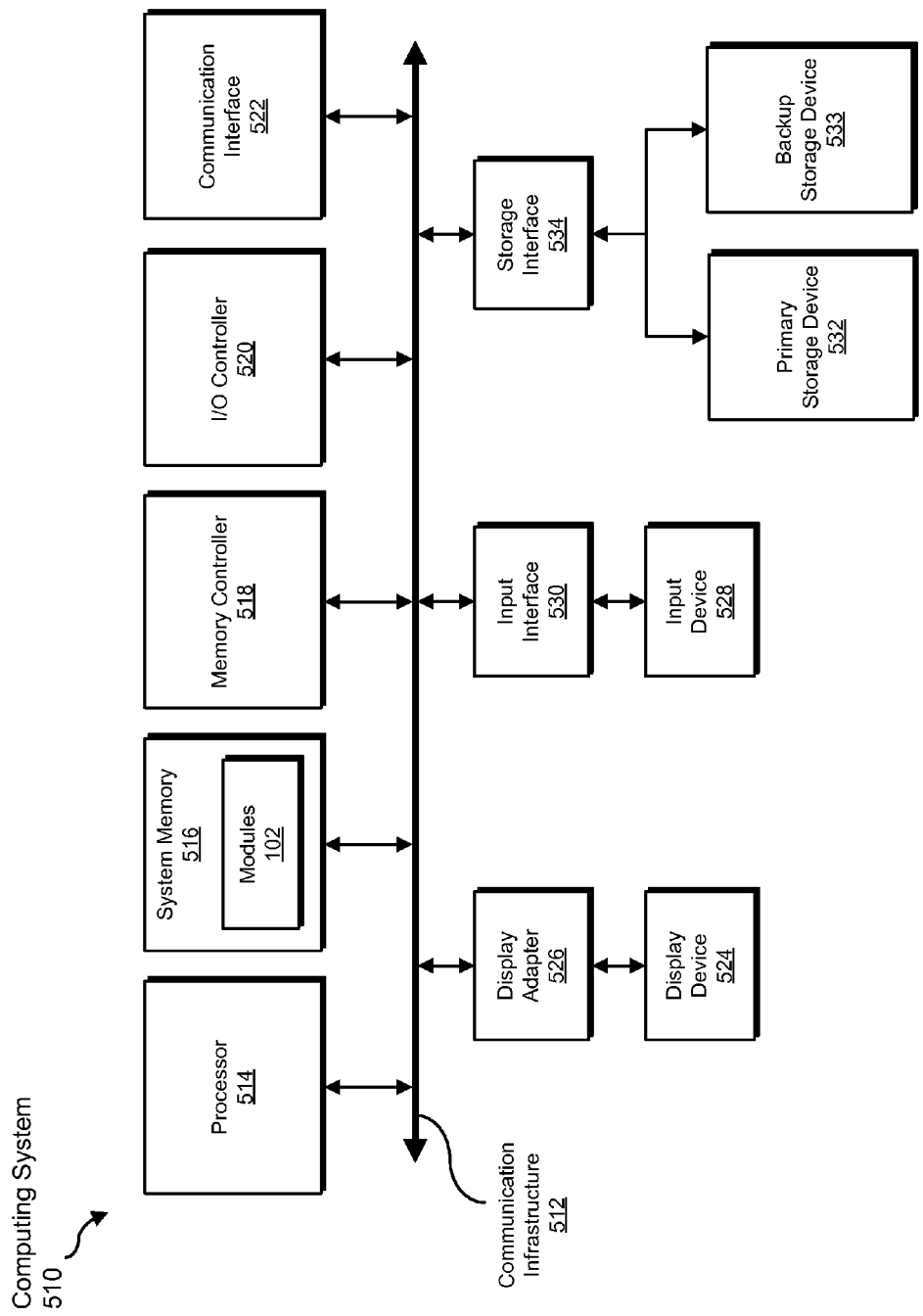
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, retrieving, parsing, generating, and restoring steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
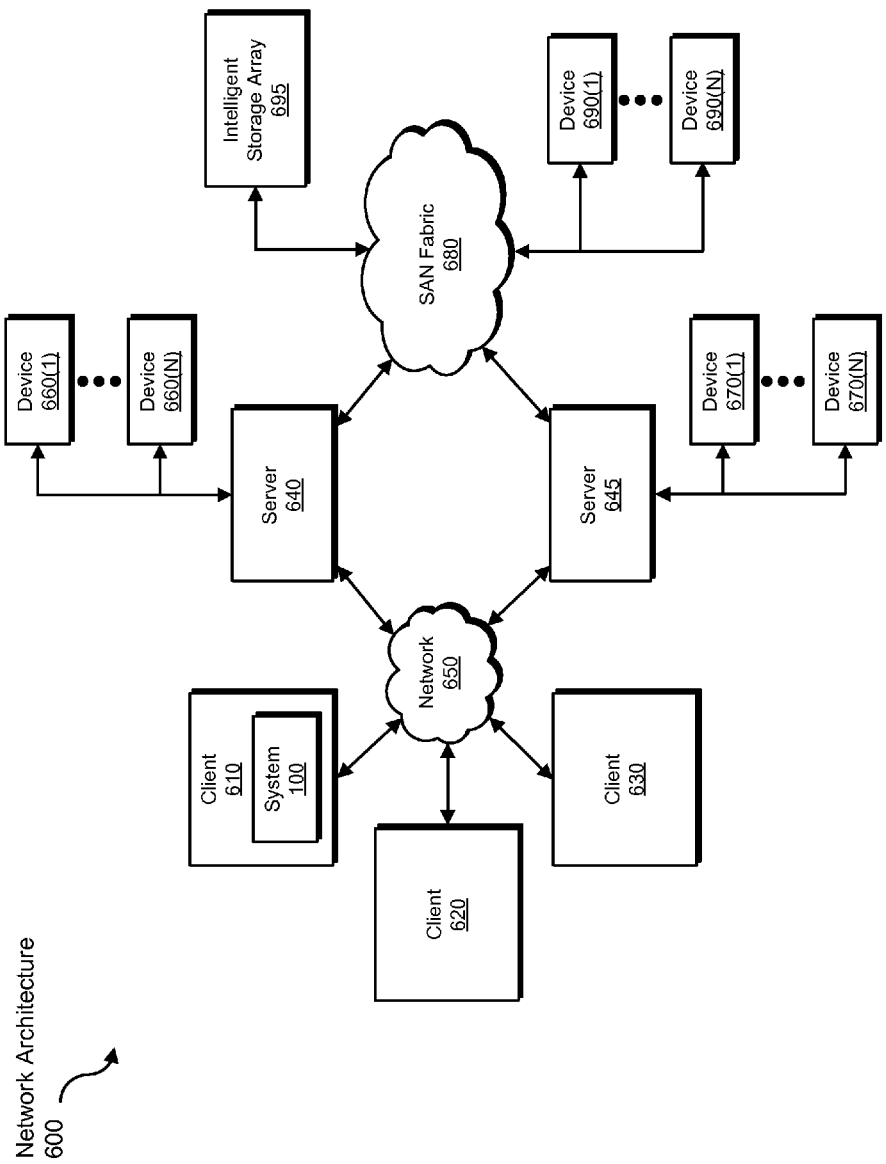
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, retrieving, parsing, generating, and restoring steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for restoring multi-tier applications.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for restoring multi-tier applications. As another example, one or more of the modules recited herein may transform a computing system into a system for executing a restored portion of a multi-tier application.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for restoring multi-tier applications, at least a portion of the method being performed by a computing device comprising at least one processor, the method comprising:

identifying a request to restore a multi-tier application from a backup of the multi-tier application, the multi-tier application comprising a plurality of individually relocatable components that are capable of being one or more of:
  installed separately from other components in the multi-tier application,
  configured separately from other components in the multi-tier application, or
  executed separately from other components in the multi-tier application;

in response to the request, retrieving a configuration data store from the backup, the configuration data store comprising a topology of the plurality of individually relocatable components;

parsing the configuration data store to extract at least a portion of the topology from the configuration data store to facilitate granular restoration of the multi-tier application, wherein:
  a first component of the multi-tier application was located on and executed on a first server of a server farm at a time of the backup, the server farm comprising a cluster of computing devices that communicate with each other as part of the multi-tier application,
  a second component of the multi-tier application was located on and executed on a second server of the server farm at the time of the backup, and
the portion of the topology represents the first component on the first server and the second component on the second server;

restoring, based on the portion of the topology, at least a portion of the multi-tier application by separately restoring the plurality of individually relocatable components, wherein restoring the portion of the multi-tier application based on the portion of the topology comprises restoring at least one component from the plurality of individually relocatable components instead of restoring every component from the plurality of individually relocatable components.

2. The computer-implemented method of claim 1, wherein:
the server farm comprises a plurality of virtual machines;
the first server comprises a first virtual machine;
the second server comprises a second virtual machine;
the first and second virtual machines operate under a single hypervisor to constitute the server farm.

3. The computer-implemented method of claim 1, wherein:
parsing the configuration data store to extract the portion of the topology from the configuration data store comprises:
  retrieving topological data from the configuration data store;
  generating a relationship map of the plurality of individually relocatable components based on the topological data;
restoring the portion of the multi-tier application based on the portion of the topology comprises restoring the portion of the multi-tier application based on the relationship map.

4. The computer-implemented method of claim 1, wherein:
the topology is accessible from the configuration data store via an application programming interface of the multi-tier application;
parsing the configuration data store comprises parsing the configuration data store without using the application programming interface.

5. The computer-implemented method of claim 1 wherein parsing the configuration data store comprises parsing the configuration data store while the configuration data store is unmounted as a database.

6. The computer-implemented method of claim 1, wherein restoring the portion of the multi-tier application comprises restoring the multi-tier application in a modified configuration by restoring the multi-tier application to alternate locations within a server farm.

7. A system for restoring multi-tier applications, the system comprising:
an identification module programmed to identify a request to restore a multi-tier application from a backup of the multi-tier application, the multi-tier application comprising a plurality of individually relocatable components;
a retrieval module programmed to, in response to the request, retrieve a configuration data store from the backup, the configuration data store comprising a topology of the plurality of individually relocatable components that are installed and executed separately from other components in the multi-tier application;
a parsing module programmed to parse the configuration data store to extract at least a portion of the topology from the configuration data store to facilitate granular restoration of the multi-tier application, wherein:
a first component of the multi-tier application was located on and executed on a first server of a server farm at a time of the backup, the server farm comprising a cluster of computing devices that communicate with each other as part of the multi-tier application,
a second component of the multi-tier application was located on and executed on a second server of the server farm at the time of the backup, and
the portion of the topology represents the first component on the first server and the second component on the second server;
a restoration module programmed to restore, based on the portion of the topology, at least a portion of the multi-tier application by separately restoring the plurality of individually relocatable components, wherein restoring the portion of the multi-tier application based on the portion of the topology comprises restoring at least one component from the plurality of individually relocatable components instead of restoring every component from the plurality of individually relocatable components;
at least one processor configured to execute the identification module, the retrieval module, the parsing module, and the restoration module.

8. The system of claim 7, wherein:
the server farm comprises a plurality of virtual machines;
the first server comprises a first virtual machine;
the second server comprises a second virtual machine;
the first and second virtual machines operate under a single hypervisor to constitute the server farm.

9. The system of claim 7, wherein:
the parsing module is programmed to parse the configuration data store to extract the portion of the topology from the configuration data store by:
retrieving topological data from the configuration data store;
generating a relationship map of the plurality of individually relocatable components based on the topological data;
the restoration module is programmed to restore the portion of the multi-tier application based on the portion of the topology by restoring the portion of the multi-tier application based on the relationship map.

10. The system of claim 7, wherein:
the topology is accessible from the configuration data store via an application programming interface of the multi-tier application;
the parsing module is programmed to parse the configuration data store by parsing the configuration data store without using the application programming interface.

11. The system of claim 7, wherein the parsing module is programmed to parse the configuration data store by parsing the configuration data store while the configuration data store is unmounted as a database.

12. The system of claim 7, wherein restoring the portion of the multi-tier application comprises restoring the multi-tier application in a modified configuration by restoring the multi-tier application to alternate locations within a server farm.

13. A non-transitory computer-readable-storage medium comprising one or more computer-executable instructions that, when executed by at least one processor of a computing device, cause the computing device to:
identify a request to restore a multi-tier application from a backup of the multi-tier application, the multi-tier application comprising a plurality of individually relocatable components that are executed separately from other components in the multi-tier application;
in response to the request, retrieve a configuration data store from the backup, the configuration data store comprising a topology of the plurality of individually relocatable components;
parse the configuration data store to extract at least a portion of the topology from the configuration data store to facilitate granular restoration of the multi-tier application, wherein:
a first component of the multi-tier application was located on and executed on a first server of a server farm at a time of the backup, the server farm comprising a cluster of computing devices that communicate with each other as part of the multi-tier application,
a second component of the multi-tier application was located on and executed on a second server of the server farm at the time of the backup, and
the portion of the topology represents the first component on the first server and the second component on the second server;
restore, based on the portion of the topology, at least a portion of the multi-tier application by separately restoring the plurality of individually relocatable components, wherein restoring the portion of the multi-tier application based on the portion of the topology comprises restoring at least one component from the plurality of individually relocatable components instead of restoring every component from the plurality of individually relocatable components.

14. The computer-readable-storage medium of claim 13, wherein:
the server farm comprises a plurality of virtual machines;
the first server comprises a first virtual machine;
the second server comprises a second virtual machine;
the first and second virtual machines operate under a single hypervisor to constitute the server farm.

15. The computer-readable-storage medium of claim 13, wherein:
the one or more computer-executable instructions cause the computing device to parse the configuration data store to extract the portion of the topology from the configuration data store by:

retrieving topological data from the configuration data store;
generating a relationship map of the plurality of individually relocatable components based on the topological data;
the one or more computer-executable instructions cause the computing device to restore the portion of the multi-tier application based on the portion of the topology by restoring the portion of the multi-tier application based on the relationship map.

* * * * *